United States Patent
Borgen et al.

(10) Patent No.: US 7,096,990 B2
(45) Date of Patent: *Aug. 29, 2006

(54) DOUBLE DISCONNECT ASSEMBLY FOR MULTI-AXLE VEHICLES

(75) Inventors: Wayne Lee Borgen, Fort Wayne, IN (US); William Gordon Hunt, Roanoke, IN (US); Jun Yoshioka, Fort Wayne, IN (US)

(73) Assignee: Spicer Technology Inc., Fort Wayne, IN (US)

( * ) Notice: Subject to any disclaimer, the term of this patent is extended or adjusted under 35 U.S.C. 154(b) by 614 days.

This patent is subject to a terminal disclaimer.

(21) Appl. No.: 09/916,256

(22) Filed: Jul. 30, 2001

(65) Prior Publication Data

US 2003/0019672 A1    Jan. 30, 2003

(51) Int. Cl.
- *B60K 23/08* (2006.01)
- *B62D 61/10* (2006.01)
- *F16D 13/54* (2006.01)

(52) U.S. Cl. ................. 180/247; 180/24.09; 192/70.21

(58) Field of Classification Search ............... 180/24.1, 180/197, 247, 14.1, 24.09, 24.08; 475/86, 475/88, 224, 230; 192/69.7, 69.8, 69.9, 70.19, 192/70.21, 48.7, 48.8, 49, 50, 69.91; 74/665 F See application file for complete search history.

(56) References Cited

U.S. PATENT DOCUMENTS

| | | | |
|---|---|---|---|
| 1,243,720 A | 10/1917 | Eidson et al. | |
| 1,440,341 A * | 12/1922 | Crispen | 475/224 |
| 1,631,837 A | 6/1927 | Stone | |
| 2,537,400 A | 1/1951 | Drong | |
| 2,914,128 A | 11/1959 | Christie | |
| 3,040,600 A * | 6/1962 | Mueller | 475/88 |
| 4,046,210 A | 9/1977 | Nelson | |
| 4,050,534 A * | 9/1977 | Nelson et al. | 180/24.09 |
| 4,271,722 A | 6/1981 | Campbell | |
| 4,625,584 A * | 12/1986 | Onodera | 475/160 |
| 4,779,698 A * | 10/1988 | Iwata | 180/247 |
| 4,817,752 A * | 4/1989 | Lobo et al. | 180/247 |
| 4,914,979 A * | 4/1990 | Balmforth | 475/221 |
| 4,981,192 A | 1/1991 | Kurihara et al. | |
| 5,394,967 A * | 3/1995 | Bigley | 192/69.4 |
| 5,692,590 A | 12/1997 | Iihara et al. | |
| 5,711,389 A | 1/1998 | Schlosser | |
| 5,950,750 A * | 9/1999 | Dong et al. | 180/24.09 |
| 5,996,720 A | 12/1999 | Hunt | |
| 6,517,462 B1 * | 2/2003 | Borgan et al. | 475/220 |
| 6,659,249 B1 * | 12/2003 | Borgen et al. | 192/50 |
| 6,964,310 B1 * | 11/2005 | Hasegawa | 180/24.09 |
| 2001/0004031 A1 * | 6/2001 | Hasegawa | 180/400 |

* cited by examiner

*Primary Examiner*—Lesley D. Morris
*Assistant Examiner*—Daniel Yeagley
(74) *Attorney, Agent, or Firm*—Berenato, White & Stavish LLC

(57) ABSTRACT

An axle disconnect system is provided whereby axles of a tandem or multi-axle vehicle may be easily and quickly engaged and disengaged as required and whereby the ring gear and differential gears remain stationary when the axle is disengaged. In multi-axle vehicles, a dual disconnect mechanism is contained in the front and auxiliary rear axles. When only the primary rear axle is necessary to propel the vehicle (e.g., during highway use) the transfer case interrupts torque to the front axle. Similarly, a clutch also interrupts torque transmission to the auxiliary rear axle. In this mode, the dual disconnect mechanism prevents the axle output shafts from back-driving the differential, thereby reducing parasitic losses and wear.

15 Claims, 5 Drawing Sheets

DOUBLE DISCONNECT ASSEMBLY FOR MULTI-AXLE VEHICLES

BACKGROUND OF THE INVENTION

1. Field of the Invention

This invention relates to differential disconnect drive assemblies or mechanisms, and in particular to dual disconnect drive assemblies, for tandem and multi-axle vehicles which can be quickly and easily engaged and disengaged as required.

2. Description of Related Art

Four-wheel drive vehicles, which are operable in either a two-wheel drive mode or a four-wheel drive mode, have gained widespread popularity. Axle disconnect mechanisms, or differential disconnect mechanisms or assemblies for such vehicles are known.

Commonly used disconnect mechanisms for four-wheel drive vehicles disconnect only one of the two output shafts on an axle assembly which is driven part time. This causes the pinion gears and the side gears of the differential to rotate due to back driving, although the differential case remains stationary. This is not compatible with speed-sensitive limited slip differentials. Also, single axle disconnect mechanisms may cause noise and wear and poor fuel economy due to rotation of the differential components while the vehicle is in two-wheel drive mode.

Various dual disconnect differential assemblies or mechanisms have been proposed. These mechanisms in general have an unnecessary number of moving parts, are fairly complex, and would be suitable only for installation on relatively wide vehicles because of the space required. Earlier designs have interposed a clutch member between the side gear and the axle shaft. None has achieved desirable commercial acceptance.

For tandem or multi-axle vehicles, current systems typically uncouple the input (prop) shaft when an axle is not needed to propel the vehicle (e.g., on highway use). This technique forces the ring gear and differential to rotate even when torque is not being transmitted through the drive axle assembly. This unnecessary rotation causes unwanted wear and frictional losses.

The need exists for a system that allows the ring gear and differential gears to remain stationary when the axle is disengaged.

SUMMARY OF THE INVENTION

The present invention provides a system whereby axles of a tandem or multi-axle vehicle may be easily and quickly engaged and disengaged as required. The present invention allows the ring gear and differential gears to remain stationary when the axle is disengaged.

In multi-axle vehicles, a dual disconnect mechanism is contained in the front and auxiliary rear axles. When only the primary rear axle is necessary to propel the vehicle (e.g., during highway use) the transfer case interrupts torque to the front axle. Similarly, a clutch also interrupts torque transmission to the auxiliary rear axle. In this mode, the dual disconnect mechanism prevents the axle output shafts from back-driving the differential, thereby reducing parasitic losses and wear.

This invention comprises a differential having first and second side gears, which are rotatable about a common transverse axis. Rotatable first and second output shafts are co-axial with the side gears, and a clutch mechanism is used for placing the output shafts simultaneously into or simultaneously out of driving engagement with the respective side gears. An actuator is used to slidably and concurrently move the driven axles between the clutch engaging position and the clutch disengaging position.

The driven axles have clutch members for engaging the clutch members of the respective first and second side gears, with the driven axles being simultaneously slidable in a first direction to a clutch engaging position and simultaneously slidable in a second direction to a clutch disengaging position. The driven axles are interconnected to provide simultaneous sliding movement.

A preferred dual disconnect differential assembly according to the invention includes, as axially engageable clutch members, a splined interface connection between the first and second side gears and the respective first and second driven axles. A biasing means is provided for biasing the driven gears to a clutch disengaging position. The vehicle is in two-wheel drive mode when the clutch is disengaged and in four-wheel drive mode when the clutch is engaged. An actuator causes sliding movement of the interconnected driven axles to translate the axles into the disengaged position.

Another aspect of the clutch mechanism of the invention provides a pair of split spline teeth on both the axle shaft and the side gear to reduce the travel distance required to engage/disengage the dual axle disconnect system.

The differential assembly of the present invention possesses several advantages, including greater fuel economy, less wear, and less noise compared to previously known disconnect mechanism in which only a single output shaft and its axle shaft are disengaged from driving engagement with a differential when two-wheel drive mode is selected. Advantages of the present invention compared to previously known dual disconnect differential assemblies include a more robust shaft/gear design without increased packaged size, fewer parts and greater compactness, which makes it possible to utilize the present dual disconnect drive mechanism on any size vehicle, including a sub-compact automobile.

Additionally, the provision of the clutch, that interrupts torque transmission to the auxiliary rear axle, prevents unnecessary rotation of the ring gear and differential at the auxiliary rear axle.

DESCRIPTION OF THE PREFERRED EMBODIMENTS

This invention will now be described in detail with reference to the best mode and preferred embodiments thereof.

Figure 1:
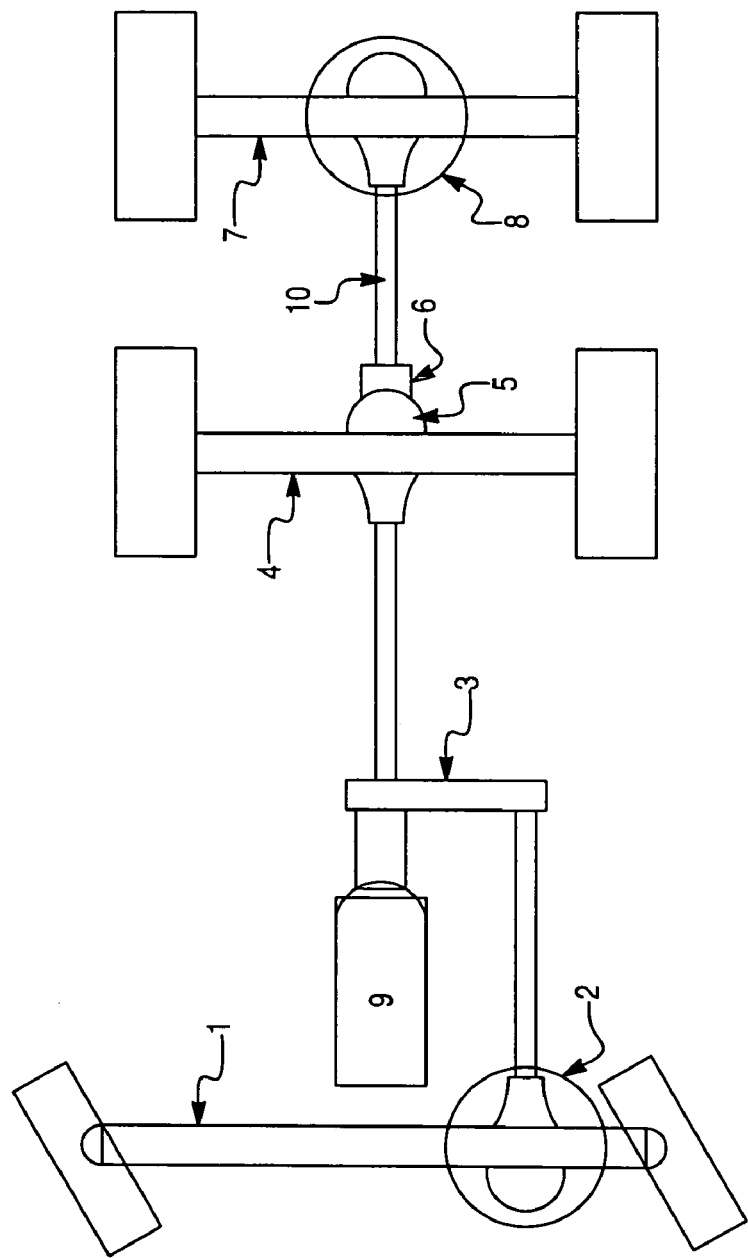
FIG. 1 is a schematic view showing the drive system for a tandem or multi-axle vehicle.

FIG. 1 is a schematic representation of the drive system for a tandem or multi-axle vehicle including a front steerable axle 1 with a first drive axle front differential 2, a torque transfer case 3, a primary rear axle 4 with associated differential 5, a rear clutch 6, and a second drive axle auxiliary rear axle 7 with associated rear differential 8. The transfer case 3 selectively transfers torque from the engine/transmission 9 to the front and rear axles 1, 4, 7.

The rear clutch 6 disconnects the rear prop shaft drive train 10 from the rear axle 4 and rear differential 5. However, absent any other disconnect mechanism the prop shaft 10, auxiliary rear axle 7, and auxiliary rear differential 8 continue to rotate due to back-driving caused by the auxiliary rear wheels drivingly connected to the auxiliary rear axle 7.

Figure 2:
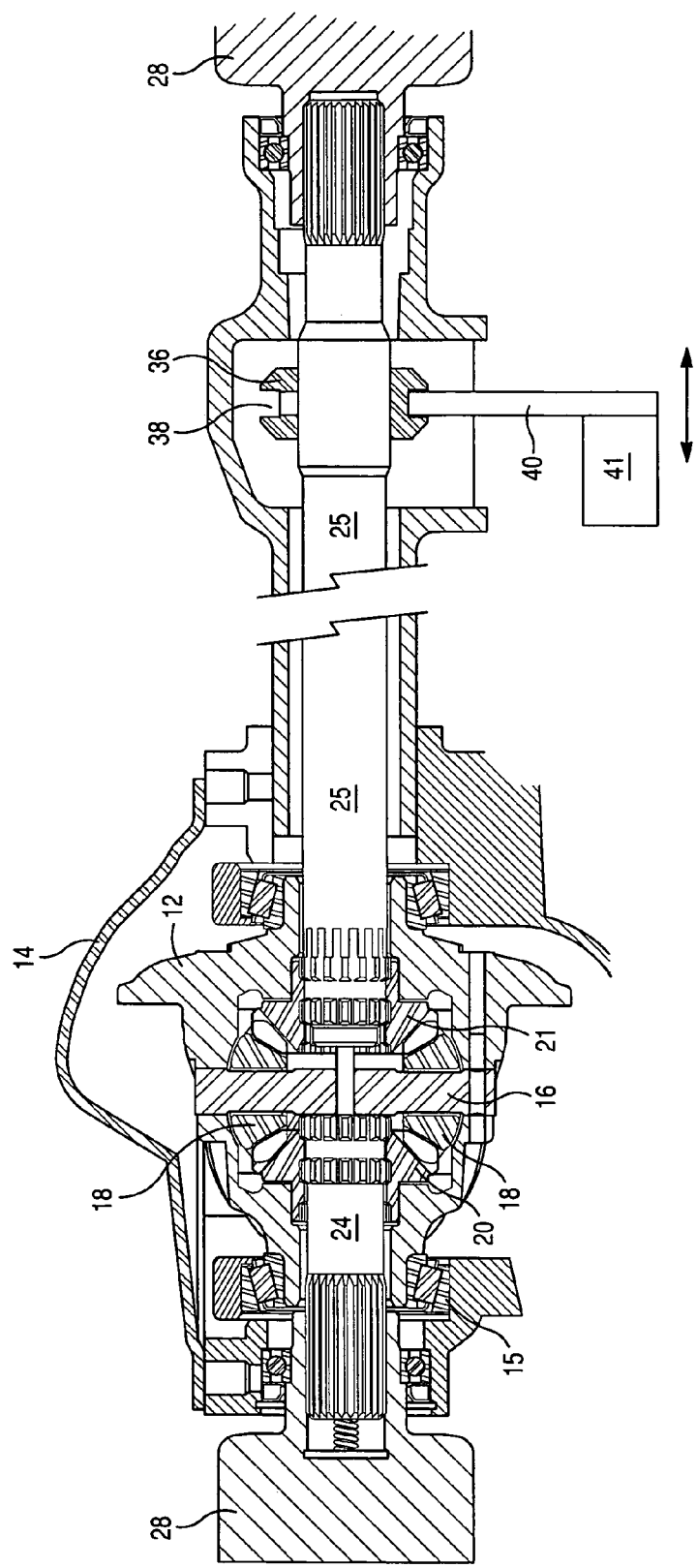
FIG. 2 is a sectional plan view of the invention according to a preferred embodiment of the invention.

Referring now to FIG. 2, a dual disconnect differential assembly 2 and 8 (or mechanism) according to this invention is shown for the front axle 1 and the auxiliary rear axle 7 of a tandem or multi-axle vehicle such as shown in FIG. 1.

The differential assembly in general is driven by longitudinally extending pinion shafts (or input shafts) extending from the transfer case 3 and/or from the rear clutch 6. The pinion shafts may engage a ring gear (not shown), which is affixed (e.g., bolted) to a differential case 12. Differential case 12 is rotatably mounted in a differential housing 14 by means of bearings 15. Differential case 12 and the ring gear affixed thereto rotate about a transverse horizontal axis, which is the axis of output shafts 24, 25.

The differential used in the practice of this invention may further include a differential cross pin 16, and pinion gears 18 which are rotatably mounted with respect to cross pin 16. The differential further includes first (or left-hand) and second (or right-hand) side gears 20 and 21, respectively (see FIGS. 2, 3, and 5). Side gears 20 and 21 are coaxial and rotate about a common transverse axis, which is also the common axis of the aforementioned axle shafts 24, 25.

Figure 3:
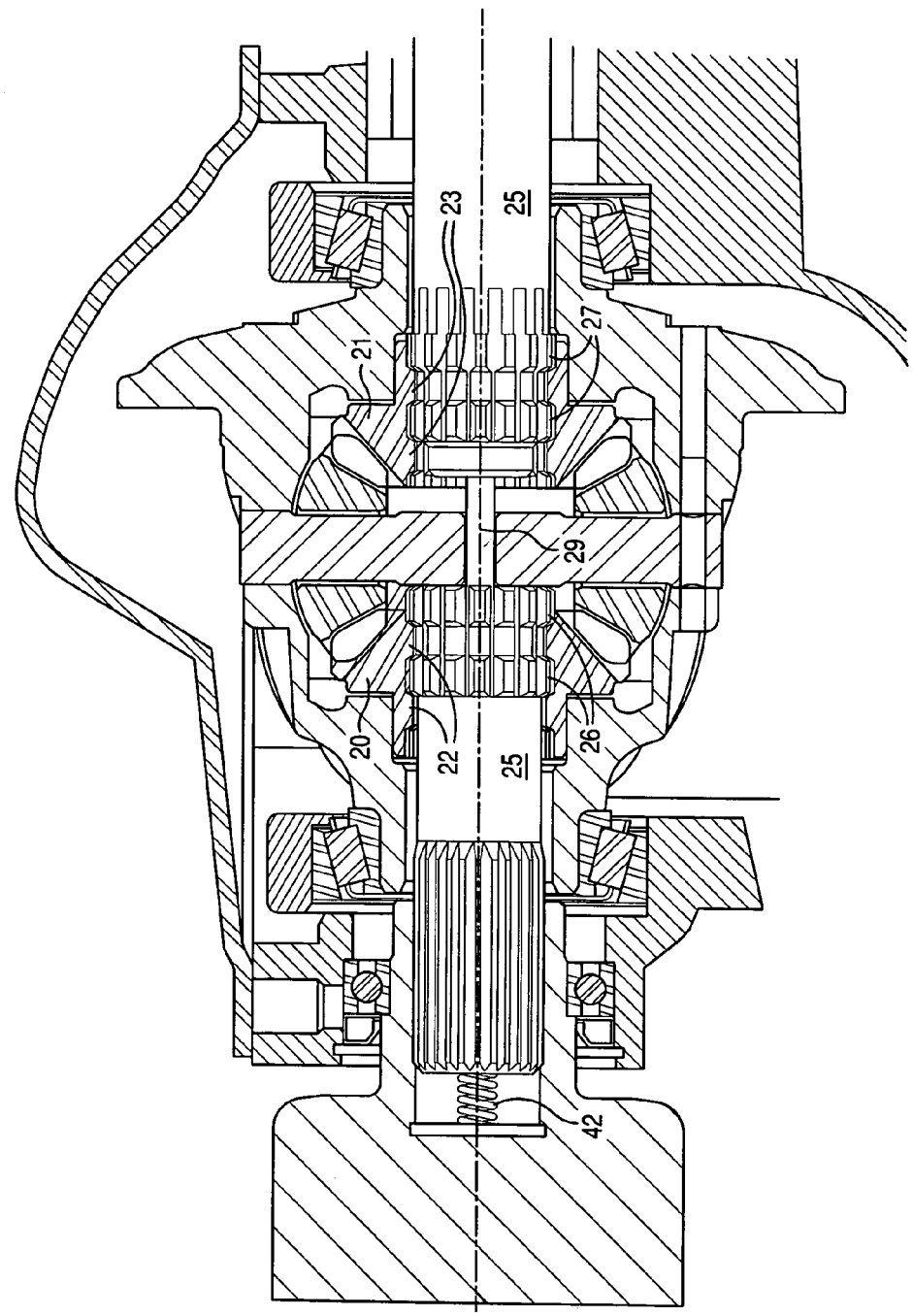
FIG. 3 is an enlarged sectional plan view of the invention according to a preferred embodiment of FIG. 2.
Figure 4:
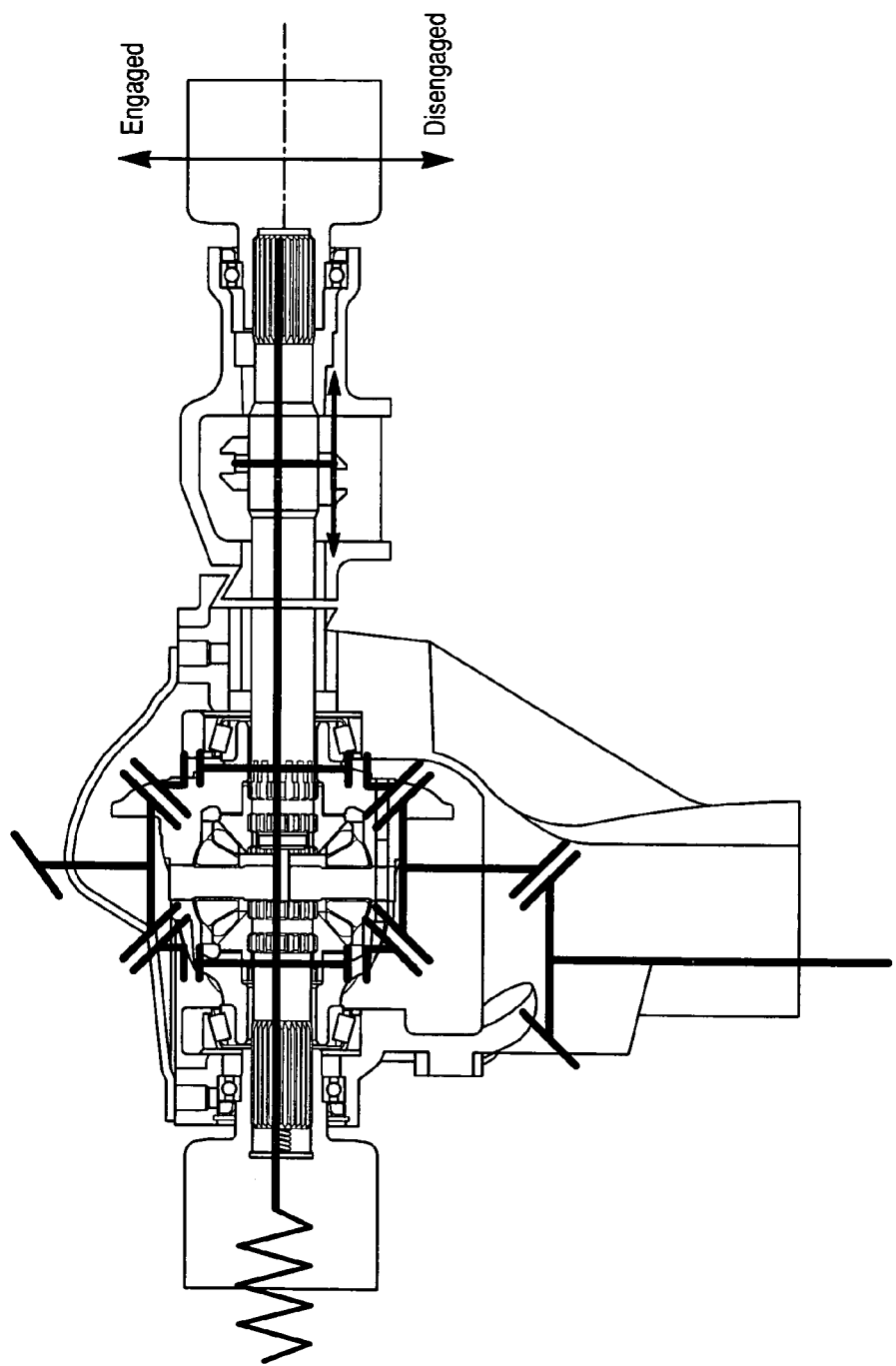
FIG. 4 is a sectional view of the dual-axle disconnect provided in the front axle and the auxiliary rear axle shown in FIG. 1 with a schematic overlay showing the torque delivery path and both the connected and disconnected positions for the dual-axle disconnect assembly.
Figure 6:
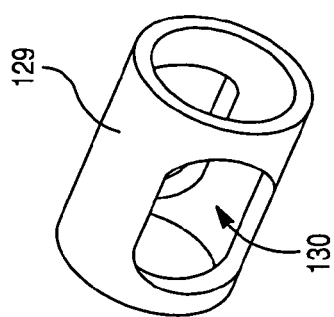
FIG. 6 is a perspective view of the interconnecting collar connecting the two driven axles of the second embodiment.

Side gears 20, 21 have respective clutch members in the form of splines 22, 23, respectively, as best seen in FIG. 3. These splines are formed on central bores of respective side gears 20, 21 near the left-hand ends thereof, at the outboard end of left-hand side gear 20 and at the inboard end of right-hand side gear 21.

The dual disconnect differential assembly 2 and 8 of this invention further includes a coaxial first (or left-hand) output shaft 24 and a second (or right-hand) output shaft 25. These output shafts 24, 25 extend transversely and are coaxial with side gears 20, 21. These output shafts 24, 25 extend from inboard ends near cross pin 16 to outboard ends, which extend outside the differential housing. Splines 26, 27 are provided at the inboard ends of output shafts for driving the same. Joints or flanges 28, which may be conventional (e.g., universal joints), are provided at respective outboard ends of output shafts 24, 25 and extend transversely outwardly to wheels (not shown) at the sides of the vehicle.

Figure 5:
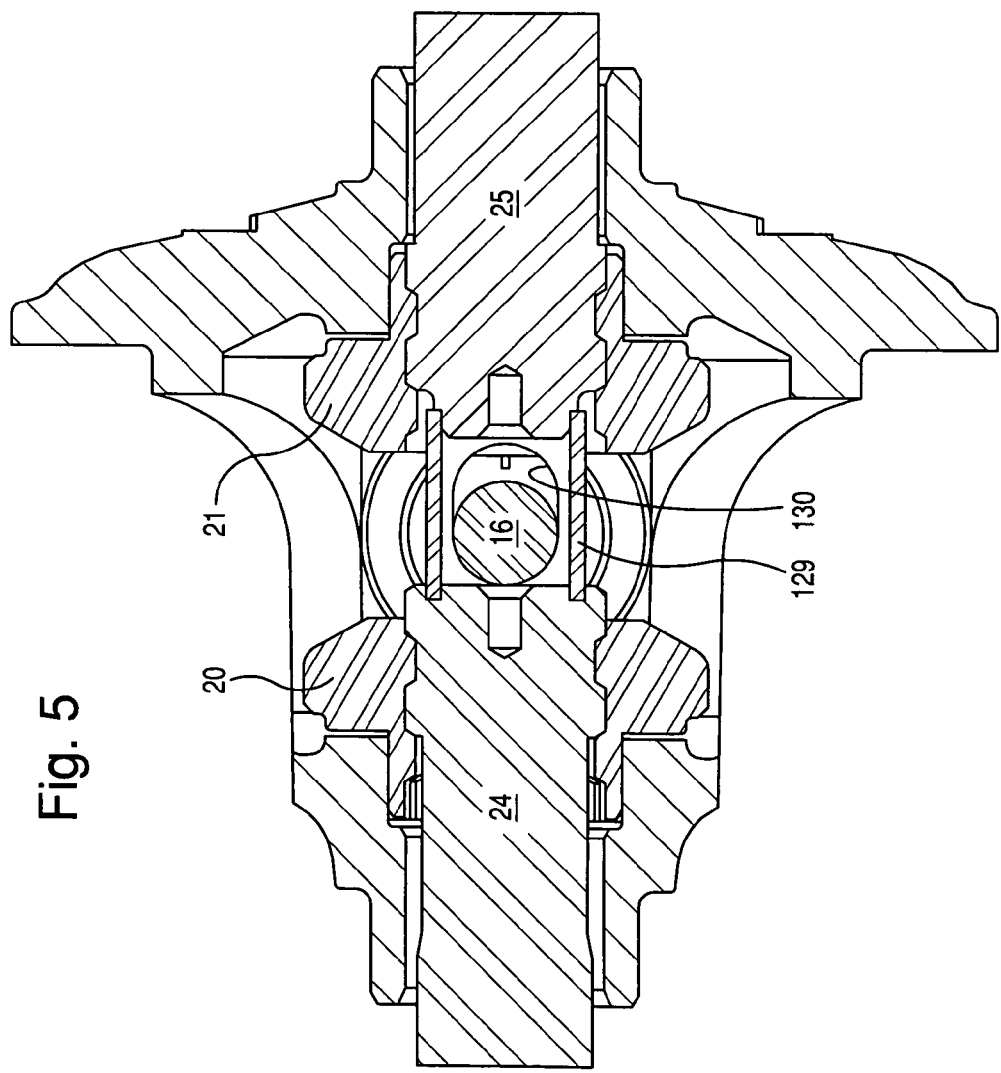
FIG. 5 is a partial sectional plan view according to the invention according to a second embodiment of the invention.

According to one important aspect of this invention, the first and second axle shafts 24, 25 are interconnected and axially slidable together as a unit. In other words, the present invention preferably provides a linking member 29 in the form of a linking interconnecting rod or other suitable member that extends through the differential assembly to connect the two axle shafts 24, 25. With this arrangement, the invention provides simultaneous axial movement of the axle shafts to thereby mutually disconnect the first and second axle shafts 24, 25 from the first and second side gears 20, 21. In the embodiment of FIGS. 2 and 3, the linking rod passes through the cross pin 16. In the alternate embodiment of FIG. 5, the linking member 129 takes the form of a connecting sleeve that connects the axle shafts 24, 25. In the arrangement of FIG. 5, the cross pin 16 passes through the connecting sleeve 129 at apertures 130. In both illustrated designs, the two driven axle shafts 24, 25 are securely linked together to provide mutual linear sliding movement between the clutch engaged and disengaged positions.

The dual disconnect differential assembly of this invention includes a clutch mechanism for simultaneously placing both output shafts 24, 25 either into or out of driving engagement with respective side gears 20, 21. The splines 22, 23 on respective side gears 20, 21 form part of this clutch assembly or mechanism.

Driven splines 26, 27 are fixedly provided or otherwise formed on respective output shafts 24, 25. Internal splines 22, 23 on the side gears 20, 21, and external splines 26, 27 on the output shafts 24, 25, prevent relative rotation while permitting axial sliding movement of the driven gears. Thus, side gears 20, 21 rotate with the respective output shafts 24, 25 in the engaged position.

The entire set of clutch members, including internally-splined side gears 20, 21 and externally-splined axle shafts 24, 25, are shown in clutch disengaging position in FIG. 2, being the normal position. Upon actuation, as will be described subsequently, the axially slidable axle shafts 24, 25 slide to the left as seen in FIG. 2 into a clutch engaging position, in which clutch members or splines 22, 23 on respective side gears 20, 21 are in engagement with respective splines 26, 27 on respective axle shafts 24, 25. Output shafts 24, 25 rotate with respective side gears 20, 21 when the clutch mechanism is in the clutch engaging position, and rotate independently of the respective side gears 20, 21 when the clutch mechanism is in the clutch disengaging position.

A compression spring 42 serves as biasing means to urge the axially slidable axle shafts 24, 25 to clutch disengaging position, i.e., to the right as seen in FIG. 2. Spring 42 abuts the first or left-hand output shaft 24.

To actuate the clutch mechanism, a clutch actuator 40 may be provided as a shift fork having a bifurcated end portion which is received in groove 38 of clutch collar 36 fixedly provides on one of the axle shafts. The shift fork 40 may be actuated by known means 41, e.g., by electrical (which is preferred) or by hydraulic, pneumatic, vacuum, or mechanical means. Actuation may be initiated either automatically or by a manual operator, such as a manual or pedal control in the vehicle cab.

The axle shafts 24, 25 and collar 36 are normally in clutch disengaging position, i.e., to the right as seen in FIG. 2. The vehicle is in two-wheel drive (2WD) mode when the clutch is disengaged. To engage the clutch mechanism and place the vehicle in four-wheel drive (4WD) mode, clutch actuator 40 moves clutch collar 36 to the left as seen in FIG. 2 against the bias of compression spring 42. Clutch collar 36 pushes the axle shafts 24, 25 to the left against the bias of spring 42, thereby placing the clutch members or splines 26, 27 on respective driven axle shafts 24, 25 in engagement with respective clutch members or splines 22, 23 on respective side gears 20, 21. With the clutch mechanism thus engaged, the axle shafts 24 are constrained to rotate at the same speeds as respective side gears 20, 21 and power is transmitted to the respective wheel ends (not shown) through the joint 28. When the need for four-wheel drive no longer exists, clutch actuator 40 is moved to the right. This also slides clutch collar 36 to the right. Compression spring 42 then pushes axle shafts 24, 25 to the right, i.e., to the clutch disengaging position, to return the vehicle to two-wheel drive mode.

From the foregoing description, it is clear that the present invention provides a system whereby axles of a tandem or multi-axle vehicle may be easily and quickly engaged and disengaged as required. The present invention allows the auxiliary ring gear and auxiliary differential gears to remain stationary when the auxiliary axle is disengaged.

In multi-axle vehicles, a dual disconnect mechanism is contained in the front and auxiliary rear axles 1, 7. When only the primary rear axle 4 is necessary to propel the vehicle (e.g., during highway use) the transfer case 3 interrupts torque to the front axle 1. Similarly, the clutch 6 also interrupts torque transmission to the auxiliary rear axle 7. In this mode, the dual disconnect mechanism prevents the axle output shafts from back-driving the differential, thereby reducing parasitic losses and wear.

The compression spring 42 (or other biasing means) is normally biased toward the clutch disengaging position, which results in disengagement of the part-time axle, since it is normally preferred to operate in two-wheel drive mode with the part-time axle disengaged except when driving conditions call for four-wheel drive operation. However, this spring can be biased toward clutch engaging position if desired. Other biasing means, as for example, an air spring, can be used in place of the compression spring shown if desired.

Further, the biasing means can be dispensed with entirely provided that some means, such as magnets on the relatively slidable members. Such magnets, if used, must not be so strong as to prevent or impede relative rotation between adjacent axially slidable members. Other mechanical mechanisms which function to shift the driven axle shafts 24, 25 to the clutch disengaging position are also contemplated herein.

It is possible to use a solenoid operator, e.g., an annular solenoid operator surrounding the output shafts 24, and, in that case, to dispense with collar 36 if desired. However, the illustrated apparatus, including a collar 36 and a shift fork 40, is preferred since this gives more versatility both as to type and location of the actuator.

It is also possible to use a spider (which typically including a ring at its center with a plurality of radially extending arms extending outwardly from the ring) in place of the cross pin 16 if desired.

The present invention provides a simple and reliable mechanism for simultaneous differential connect and simultaneous differential disconnect. In other words, both output shafts 24, 25 are simultaneously connected or disconnected from their respective side gears 20, 21 in the apparatus of this invention. The novel dual disconnect differential assembly herein avoids the known disadvantages of single shaft disconnect mechanism, such as back drive, as has been discussed earlier.

The two side gears 20, 21 are free to rotate at different speeds, whether the output shafts 24 are engaged with or disengaged from the respective side gears 20, 21. However, if desired, a differential assembly for a part-time axle as herein illustrate can be further provided with a differential lockout mechanism (which may be conventional) if desired.

While this invention has been described in detail with reference to the preferred embodiments thereof, it shall be understood that various modifications (including those specifically discussed above and others) can be made without departing from the scope and spirit of this invention.

What is claimed is:

1. A double disconnect assembly in a drive assembly of a motor vehicle comprising:
    a first drive axle;
    a second drive axle driven by a drive train;
    a first clutch assembly for selectively engaging and disengaging said drive train; and
    a second clutch assembly for selectively engaging and disengaging first and second axle shafts of said second drive axle from a differential assembly, wherein said differential assembly comprises pinion gears rotatably mounted with respect to a cross pin, first and second side gears being rotatable about a common transverse axis, and said first and second axle shafts which are co-axial with said first and second side gears, respectively,
    wherein said first and second axle shafts are axially slidable with respect to said differential assembly and interconnected to provide simultaneous axial movement of said axle shafts to thereby mutually disconnect said first and second axle shafts from said first and second side gears.

2. The double disconnect assembly according to claim 1, further comprising a primary rear drive axle, wherein said drive train is an auxiliary rear prop shaft and said second drive axle is an auxiliary drive axle of a tandem vehicle.

3. The double disconnect assembly according to claim 1, wherein, when said first and second clutch assemblies are in a nonengaged condition, said differential assembly is in a non-rotating state.

4. The double disconnect assembly according to claim 1, further comprising an interconnecting member interconnecting said first and second axle shafts to translate simultaneously along said transverse axis.

5. The double disconnect assembly according to claim 4, wherein said interconnecting member comprises a rod extending from an inboard end of said first axle shaft to an inboard end of said second axle shaft.

6. The double disconnect assembly according to claim 5, wherein said rod passes through said cross pin.

7. The double disconnect assembly according to claim 1, further comprising:
    first clutch members on said first and second side gears; and
    second clutch members on said first and second axle shafts for engaging said first clutch members of respective first and second side gears.

8. The double disconnect assembly according to claim 7, wherein said first and second side gears have axially extending central bores, said first clutch members on said first and second side gears are splines formed on portions of said bores, said second clutch members on said first and second axle shafts are splines formed on outer surfaces thereof, the splines on said first and second side gears and the splines on said first and second axle shafts being in engagement when said first and second axle shafts are in a clutch engaging position and out of engagement when said first and second axle shafts are in a clutch disengaging position.

9. The double disconnect assembly according to claim 8, wherein a compression spring urges said first and second axle shafts toward one of said clutch engaging position and said clutch disengaging position.

10. The double disconnect assembly according to claim 9, wherein said compression spring urges said first and second axle shafts toward said clutch disengaging position.

11. The double disconnect assembly according to claim 1, further including a clutch collar which is mounted on one of said first and second axle shafts for axially moving said first and second axle shafts simultaneously in the same direction between a clutch engaging position and a clutch disengaging position.

12. The double disconnect assembly according to claim 11, further including an actuator, wherein said actuator includes an arm for engaging said clutch collar for slidably moving said first and second axle shafts between said clutch engaging position and said clutch disengaging position.

13. The double disconnect assembly according to claim 1, wherein outer surfaces of said first and second axle shafts and inner surfaces of said first and second side gears have complementary splines.

14. The double disconnect assembly according to claim 1, wherein said first and second axle shafts are in driving engagement with said first and second side gears when said first and second axle shafts are in a clutch engaging position and are in a free-wheeling mode when said first and second axle shafts are in a clutch disengaging position.

15. The double disconnect assembly according to claim 1, further comprising a splined interconnection between the axle shafts and the side gears whereby splines of the splined interconnection are divided into a pair of axial-spaced rows of gear teeth on each of said first and second axle shafts and said first and second side gears.

* * * * *